April 17, 1962 — E. A. BAUER ETAL — 3,029,633
BUZZ DETECTOR
Filed Sept. 23, 1957 — 2 Sheets-Sheet 2
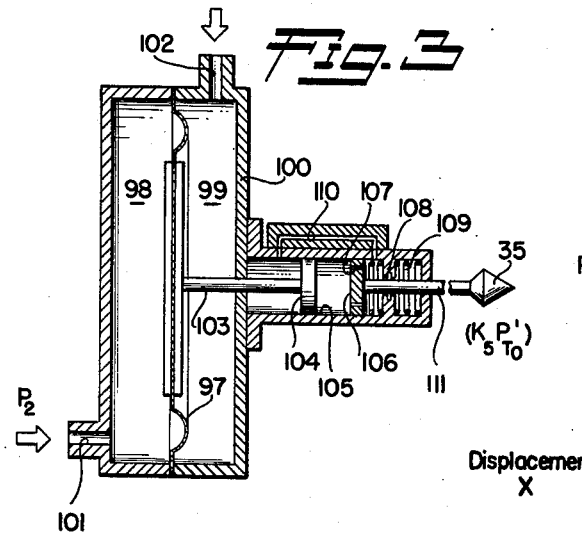
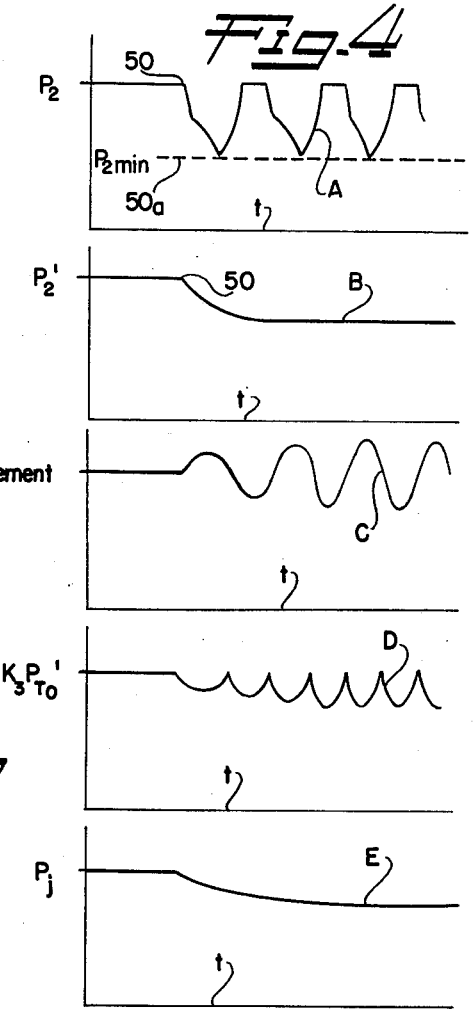
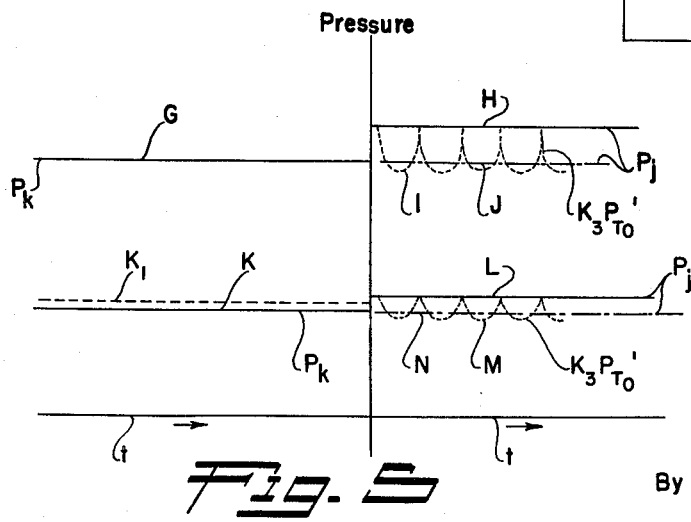
INVENTORS
ERNEST A. BAUER
PHILIP R. DAHL
By R. E. Geauque
Attorney United States Patent Office 3,029,633
Patented Apr. 17, 1962

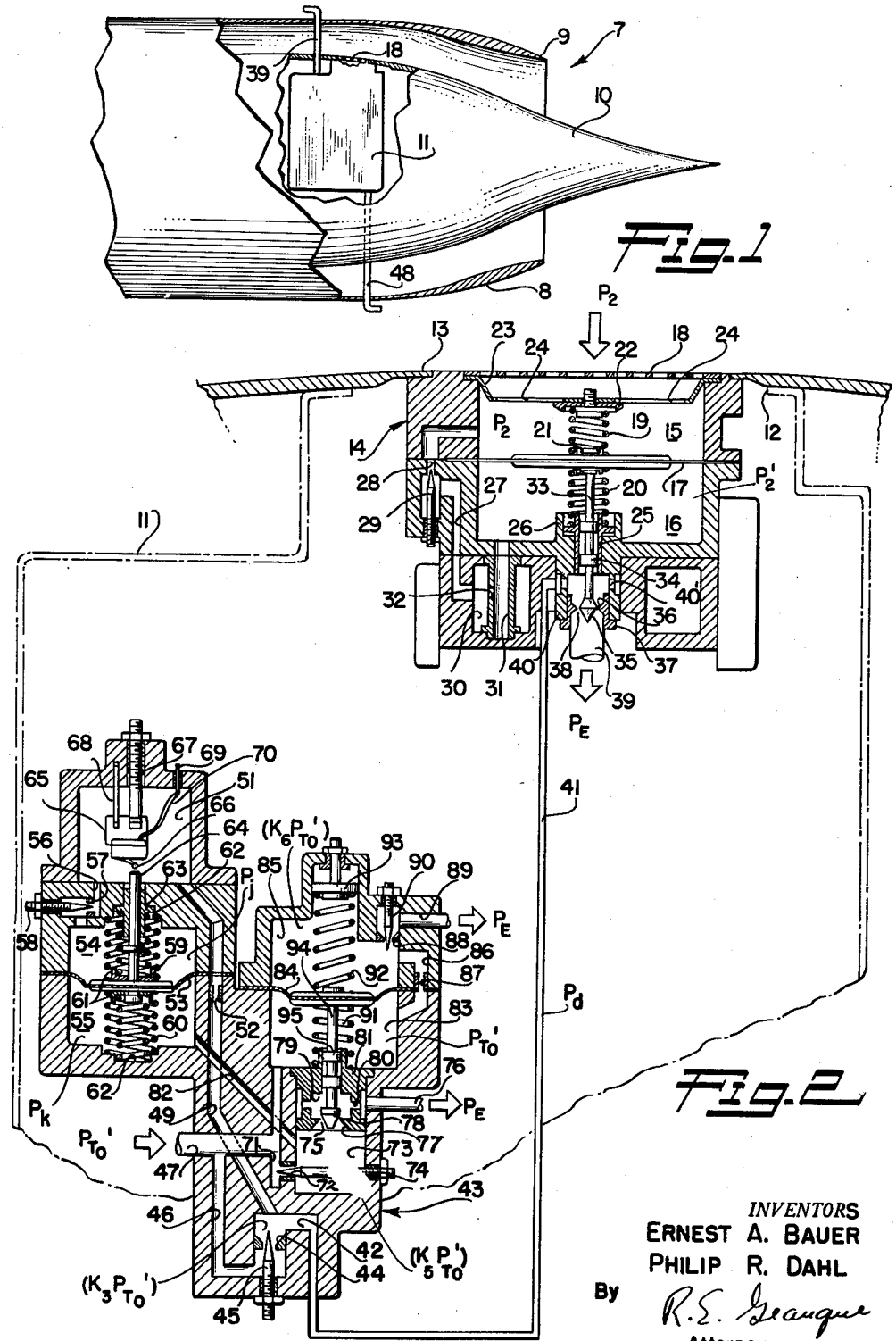

3,029,633
BUZZ DETECTOR
Ernest A. Bauer, Burbank, and Philip R. Dahl, Granada Hills, Calif., assignors to The Marquardt Corporation, a corporation of California
Filed Sept. 23, 1957, Ser. No. 685,480
15 Claims. (Cl. 73—116)

This invention relates to a buzz detector and more particularly to a device for detecting periodic variation of the pressure level within the diffuser of jet engine inlets.

The buzz or periodic variation in pressure level within the diffuser occurs at certain operating conditions and, like all oscillations, it is characterized by the frequency and amplitude of the pressure variation. When buzz occurs within the diffuser, it may cause engine blowout or structural destruction and the present invention provides a device to supply warning of the presence of buzz in the diffuser. This warning can be in the form of a pneumatic, hydraulic or electrical signal to indicate the presence of buzz of certain previously specified frequencies or amplitudes or both.

The actual pressure variation within the diffuser is sensed by the invention and converted into a pressure level which operates the buzz warning signal. The buzz detector can be in the form of a self contained unit and can be attached to diffusers of various construction, either initially or as auxiliary equipment for previously constructed diffusers. The only connection required between the device of the invention and the element controlled by the device is a suitable signal line since the device requires no external power sources for its maintenance and operation.

In operation, the buzz detector continuously monitors diffuser pressure while the aircraft is in flight and this pressure undergoes oscillation when buzz occurs. During buzz, the detector develops a signal which is proportional to the amplitude of the oscillation. In order to eliminate accidental actuation of this buzz detector by transient oscillations of very short duration, an internal time delay is utilized to cancel out disturbances which die down within a specified time interval. If the oscillations continue beyond a specified interval, an isolated pressure which is proportional to the amplitude of the buzz oscillation actuates a warning signal. The device incorporates frequency sensitive highpass and lowpass filters so that only frequency variations of a certain range in diffuser pressure will actuate the warning signal. Also, the level of the isolated pressure required to produce a warning signal can be varied in accordance with selected conditions, such as flight altitude.

It is therefore an object of the present invention to provide a buzz detector for sensing pressure variation in the diffuser of a jet engine.

Another object of the invention is to provide a buzz detector for sensing pressure variations in the diffuser of a jet engine at selected frequencies and amplitudes and of a specified duration.

A still further object of the invention is the provision of a buzz detector in which an isolated pressure proportional to amplitude of pressure variation in an engine diffuser is utilized to provide a warning signal.

These and other objects of the invention not specifically set forth above will become readily apparent from the accompanying description and drawings in which:

FIGURE 1 is an elevational view partly in section showing the buzz detector located within the diffuser body of a jet engine inlet.

FIGURE 2 is a diagrammatic illustration of the buzz detector showing the pressure repsonsive diaphragm and the warning switch.

FIGURE 3 is a modified form of device for sensing pressure variations in the diffuser.

FIGURE 4 is a plot illustrating the manner in which the buzz detector produces an isolated pressure in response to a buzz condition.

FIGURE 5 is a plot illustrating the manner in which the isolated pressure is compensated for altitude and Mach number.

FIGURE 6 is a modified form of device for compensating for changes in flight altitude.

Referring to FIGURE 1, the engine inlet 7 comprises an engine cowling 8 having an inlet lip 9 and a diffuser body 10 positioned within the cowling and extending forwardly of the inlet lip. Any well known shape of diffuser body which provides for pressure recovery within the engine can be utilized in connection with the present invention. The buzz detector of the present invention can be located at any suitable location on the engine or supporting structure and can conveniently be located in casing 11 suitably supported within the interior of the diffuser body 10. The casing has a circular opening defined by edge 12 and the opening is located adjacent an opening in the diffuser body defined by edge 13. A body member 14 has one end secured in the opening at edge 13 and extends into casing 11.

The body member contains a cavity which is divided into spaces 15 and 16 by a diaphragm 17 and space 15 communicates with the pressure $P_2$ within the diffuser through an open grid 18. Two opposed springs 19 and 20 bear against opposite sides of diaphragm 17 and the ends of the springs adjacent the diaphragm are held in position by lugs 21 carried by the diaphragm. The other end of spring 19 bears against a seat 22 carried by a bracket 23 rigidly supported by body member 14. Bracket 23 extends across space 15 and contains slots 24 to permit pressure $P_2$ to act directly against one side of diaphragm 17. The other end of spring 20 bears against a flange of hollow insert 25 located in a cup-shaped extension 26 of body member 14.

A passage 27 in body member 14 connects space 15 with space 16 and contains a restriction 28 which receives the end of an adjustable needle valve 29. The passage also comprises an enlarged cylindrical chamber 30 containing a hollow cylindrical member 31 having a restricted opening 32 for connecting the chamber 30 with space 16. A stem 33 is connected with diaphragm 17 and is guided by sealing lands 34 which are carried by the stem and located within hollow insert 25. The end of stem 33 carries a valve element 35 which is in the form of a double cone. The conical surfaces of the valve element cooperate with a circular restricting edge 36 on hollow insert 37 in order to provide an orifice 38 whose area can be varied by movement of valve element 35 in either direction. The orifice 38 discharges through passage 39 to atmospheric pressure $P_E$. The insert 37 is contained within a hollow extension 40 of member 14 and the extension contains an opening 40' connecting the interior of the extension and orifice 38 with passage 41.

Passage 41 also connects with a chamber 42 in body member 43 and this chamber contains a restriction or orifice 44 receiving the end of adjustable needle valve 45. The chamber 42 is also connected by passage 46 to a passage 47 containing freestream total pressure $P_{T_0}'$ supplied by pressure probe 48 (see FIG. 1). Thus, pressure fluid flows through passages 47, 46, 41 and 39 to atmosphere and through normally fixed orifice 44 and variable area orifice 38. These orifices form the two orifices of a pressure divider system, such as described in U.S. Patent No. 2,645,240, granted July 14, 1953, to John A. Drake, since the pressure drop across the orifice will cause sonic velocity flow at their throats. Thus, the pressure sensed by passage 49 connected to chamber 42 at a location between the orifices will be a fraction $K_3$ of pressure $P_{TO}'$ determined by the ratio of the throat areas of the orifices 38 and 44.

Referring now to the operation of the buzz detector as described thus far, the space 15 and the side of diaphragm 17 associated with space 15 will directly receive the pressure oscillations in the diffuser with practically no attenuation. However, these same pressure oscillations undergo amplitude attenuation in being transmitted to space 16 because these oscillations must be transmitted through restriction 28 in passage 27, plenum chamber 30 and restricted opening 32. These two restrictions and the plenum chamber together with springs 19 and 20 and flexible diaphragm 17 also serve as a frequency sensitive pneumatic highpass filter. The degree of amplitude attenuation of the pressure oscillations transmitted to space 16 depends, of course, on the physical parameters of the restrictions and the plenum chamber and these elements can be designed to accommodate almost any frequency vs. pressure attenuation characteristic. Due to the differences in pressure amplitude in spaces 15 and 16, the spring loaded diaphragm 17 will undergo periodic deflection when pressure oscillations occur in the diffuser. The amplitude of this deflection is a function of frequency and input pressure and can be reasonably well represented by the transfer function $$\frac{X(s)}{P(s)} = \frac{K_1 t_1 s}{(1 + t_1 s)}$$

where X is diaphragm and valve element deflection, P is the amplitude of the pressure variation in the diffuser, $K_1$ is the filter gain which is a function of diaphragm area and the spring constant of the diaphragm spring, $t$ is the time constant of the pneumatic filter, and $s$ represents the Laplacian operator.

The deflections of diaphragm 17 are transmitted into oscillation of valve element 35 relative to the restricting edge 36 in order to vary the area of the orifice 38. Referring to FIGURE 4, curve A is a plot of typical pressure variations in the diffuser against time in case of buzz and illustrating the occurrence of buzz at point 50 on the curve. Curve B illustrates the manner in which the pressure $P_2'$ in space 16 varies because of the presence of the filter system between spaces 15 and 16. The pressure $P_2'$ approaches a level somewhat higher than the minimum pressure $P_2$ in the diffuser, designated by line 50a. The displacement of the stem 33 and valve element 35 caused by the difference in pressures $P_2$ and $P_2'$ is illustrated by curve C and the variation in pressure $K_3 P_{TO}'$ in chamber 42 of the pressure divider system caused by movement of valve element 35 is shown by curve D. Since the valve element 35 has two identical conical surfaces, movement of the valve element in either direction from its center position will increase the area of orifice 38 and cause a decrease in pressure in chamber 42. Thus, the cyclic variations in chamber 42 will be in the direction of lower pressure than exists during steady state operation of the pressure divider system.

Referring again to FIGURE 2, passage 49 connects with chamber 51 in body member 43 and contains a restriction 52. A diaphragm 53 divides another chamber in body member 43 into spaces 54 and 55. The chamber 51 is connected with the space 54 by a passage 56 which contains a restriction 57 adjustable by needle valve 58. The diaphragm 53 is acted upon by double springs 59 and 60 located on opposite sides of the diaphragm. One end of each double spring is positioned by a seat 61 on the diaphragm and the other end of each double spring is located in a depression 62 in body member 43. The depression for the end of spring 59 contains an opening for insert 63 and this insert slidably supports a stem 64 connected with diaphragm 53. An electrical switch 65 is located in chamber 51 opposite the end of stem 64 and has a switch arm 66 for closing the switch to produce a warning signal. The switch is supported within chamber 51 by adjustable support rod 67 and guide rod 68 so that the distance between the switch arm 66 and the end of stem 64 can be adjusted. A terminal 69 passes through body member 43 and is connected to switch 65 by leads 70 so that the warning signal can be transmitted to any suitable alarm, or to any suitable control system which can correct engine operation to eliminate the diffuser buzz. Such a control system could reduce diffuser pressure by opening a by-pass door or by reducing fuel flow. By reducing diffuser pressure, normal shock is maintained within the inlet and buzz will not occur.

The pressure oscillations in chamber 42 are transmitted through passage 49 and restriction 52 to chamber 51 and from chamber 51 to space 54 through restriction 57. These elements serve as a lowpass filter which evens out the cyclic variations of pressure in chamber 42 and integrate these variations to provide a pressure level $P_j$ in chamber 54 during buzz which is lower than the level of pressure $K_3 P_{TO}'$ existing in chamber 42 during steady state operation without diffuser buzz. Curve E of FIGURE 4 illustrates the pressure variation in chamber 54 resulting from the filter action, and the restrictions 52 and 57 allow for a time lag in the reduction of pressure level $P_j$ in space 54. It is apparent that the change in pressure level in space 54 during diffuser buzz can be utilized in a variety of devices to move stem 63 against a selected bias pressure and operate switch 65. Also, it is apparent that a wide variety of devices, other than switch 65, can be operated in response to the pressure drop. The time lag provided by the restrictions is utilized to prevent switch actuation by pressure oscillations which die down within a specified time interval.

The mechanism shown for providing a pressure bias for the diaphragm 53 compensates for flight altitude and Mach number. The passage 47 supplies freestream total pressure $P_{TO}'$ to a passage 71 which is connected at one end through a restriction or orifice 72 with chamber 73. A needle valve 74 is provided to adjust the throat area of orifice 72. A second orifice 75 connects chamber 73 with exhaust passage 76 and comprises a restriction 77 and a movable valve element 78. The discharge flow from orifice 75 passes through chamber 79 and opening 80 formed in body element 81. Thus, the orifices 72 and 75 form a pressure divider system, having an adjustable fixed orifice and a variable area orifice and the pressure in chamber 73 will be a fraction $K_5$ of pressure $P_{TO}'$ depending upon the ratio of throat areas of the orifices. A passage 82 continually connects the pressure in chamber 73 with the space 55 so that this pressure $K_5 P_{TO}'$ acts against the pressure $P_j$ built up in space 54 and the difference in these pressures control the actuation of switch 65.

The passage 71 also connects pressure $P_{TO}'$ to space 83 on one side of diaphragm 84 and the space 83 is connected with space 85 on the opposite side of the diaphragm by passage 86, containing fixed restriction or orifice 87. A second orifice or restriction 88 connects the pressure in space 85 with exhaust passage 89 and this orifice contains needle valve 90 to adjust its throat area. Two springs 91 and 92 bear on opposite sides of diaphragm 84 and one end of spring 92 bears against an adjustable disc 93 which serves to adjust the force of this spring. A stem 94 is secured to the diaphragm and is guided in element 81 by lands 95. The end of stem 94 comprises valve element 78 which serves to vary the throat area of orifice 75.

It is apparent that orifices 87 and 88 form another pressure divider system which receives the pressure $P_{TO}'$ in space 83 and produces a pressure $K_6 P_{TO}'$ in space 85, the value of $K_6$ depending upon the ratio of the throat areas of the orifices. Thus, the value $P_{TO}' - K_6 P_{TO}'$ represents the fluid pressure force on diaphragm 84 and the position of valve element 78 will vary with $P_{TO}'$ in a selected manner. The position of valve element 78 determines the area of orifice 75 and therefore compensates the pressure $K_5 P_{T0}'$ in chamber 73 for changes in the level of pressure $P_{T0}'$. Since the pressure $P_{T0}'$ is a function of altitude and flight speed, the pressure difference required to operate switch 65 will automatically be varied with changes in these quantities.

Referring now to the overall operation of the device, the pressure $P_j$ in space 54 during steady state operation is the same as pressure $K_3 P_{T0}'$ in space 42, and the pressure $P_k$ in space 55 is the same as pressure $K_5 P_{T0}'$ in space 73. However, the forces on diaphragm 53 are adjusted so that the pressure in space 55 is less than the pressure $P_j$ in space 54 during steady state operation. This can be accomplished by having the area of orifice 75 greater than the area of orifice 38. Thus, the diaphragm 53 is held in a position away from center and away from switch 65 during steady state operation. When diffuser buzz occurs, the pressure variation in chamber 42 resulting from movement of valve element 35 causes reduction in the pressure level $P_j$ in chamber 54 until it is equal to the steady pressure in chamber 55 corresponding to pressure $K_5 P_{T0}'$. Thereupon, the diaphragm 53 will become centered and stem 64 will move to actuate switch 65. The amount of decrease in pressure $P_j$ required to operate the switch will depend upon the position of valve element 78 which is controlled by the pressure $P_{T0}'$ and since pressure $P_{T0}'$ is a function of altitude and Mach number, the amplitude of pressure variation required to produce a signal will vary with these quantities. The connection between spaces 15 and 16 provide a highpass filter and the connection between spaces 42 and 54 provide a lowpass filter so that only pressure variations within a selected frequency range are operative to produce a warning signal. Also, by adjustment of the initial position of valve element 78, the amplitude of the pressure variation required to produce a warning signal can be selected.

If the compensation provided by diaphragm 84 and valve 78 is eliminated and the area of orifice 75 is fixed, any change in the level of $P_{T0}'$ is automatically compensated for by the use of two pressure divider systems which connect with spaces 54 and 55. This results because of the fact that the divided pressures in two pressure dividers with equal effective ratios of orifice areas will be the same if the supply pressure to both dividers is the same. During buzz of amplitude required to produce a warning signal, the effective area ratio of the pressure divider including orifices 38 and 44 will be equal to the calibrated orifice area ratio of the pressure divider consisting of orifices 72 and 75, and for this reason, the effective divided pressure in spaces 54 and 55 will be equal at all levels of $P_{T0}'$ upon occurrence of buzz amplitude. Referring to FIGURE 5, curves G and H represent the pressure difference between the pressure $P_j$ and $P_k$ for steady state operation at a high level of $P_{T0}'$. The dotted line curve I represents the pressure variations $K_3 P_{T0}'$ in chamber 42 during buzz and dashed line J represents the resulting lower pressure $P_j$ during buzz which becomes equal to $P_k$ to actuate the warning signal. If the value of supply pressure $P_{T0}'$ drops, the warning signal will still be operated by the same amplitude of diffuser pressure variation assuming valve 78 is fixed. The reduced pressure difference between the pressure $P_j$ and $P_k$ for steady state operation and at reduced pressure $P_{T0}'$ is shown by curves K and L. Also, the reduced amplitude of pressure variations $K_3 P_{T0}'$ in chamber 42 is shown by dotted curve M and the reduced value of $P_j$ during buzz is shown by dashed curve N. The reduction in amplitude of pressure variations in chamber 42 at reduced pressure $P_{T0}'$ and with the same amplitude variations in the diffuser, results from the fact that the variation in $K_3$ remains the same while the pressure $P_{T0}'$ is reduced. For the same reason, the difference between pressures $P_j$ and $P_k$ is less at lower pressure $P_{T0}'$ since the factor $K_5$ remains the same. Thus, the invention operates independently of the level of pressure $P_{T0}'$ except for the compensation introduced at valve element 78.

When the diaphragm 84 is utilized to change the area of orifice 75 with a drop in $P_{T0}'$, there will also be a change in the position of the level of pressure $P_k$ from that shown by curve K (which corresponds to a fixed area of orifice 75). The reduction in pressure $P_{T0}'$ causes the differential on diaphragm 84 to decrease because of the action of orifices 87 and 88 and the decrease will cause valve 78 to move towards closed position. This closing of valve 78 will cause pressure $P_k$ to assume a value represented by curve $K_1$ which is higher than shown by curve K so that the diaphragm 84 serves to vary the pressure $P_k$ with change in pressure $P_{T0}'$ in a different manner than would occur if the valve 78 were fixed. When an increase in pressure $P_{T0}'$ occurs, the differential on diaphragm 84 will increase to open valve 78 and provide a level of pressure of $P_k$ below that which would result if the valve 78 were fixed. Thus, the buzz amplitude required to produce a pressure $P_j$ equal to the pressure $P_k$ will vary with $P_{T0}'$ because of the action of diaphragm 84 in changing the pressure $P_k$. The inclusion of diaphragm 84 permits an arbitrary scheduling of the area of orifice 75 with pressure $P_{T0}'$ resulting in arbitrary scheduling of the buzz warning signal amplitude as a function of $P_{T0}'$.

A modification of the device for sensing buzz in the diffuser is shown in FIGURE 3 and comprises a diaphragm 97 separating spaces 98 and 99 in housing 100. A passage 101 connects diffuser pressure $P_2$ with space 98 while passage 102 connects $P_{T0}'$ with space 99. A stem 103 is connected with diaphragm 97 at one end and with piston 104 at the other end. The piston 104 is located in cylinder 105 which also contains a second piston 106 having bleed passages 107. Piston 106 is supported by extension 108 and is biased toward piston 104 by spring 109. The cylinder 105 is filled with viscous fluid or gas and this fluid or gas is bypassed through passage 110 from one side of piston 104 to the opposite side of piston 106. A stem 111 is connected to piston 106 and to valve element 35. Since the pressure $P_{T0}'$ is steady, variations in diffuser pressure $P_2$ during buzz will cause movement of diaphragm 97 and piston 104. This deflection is sensitive to amplitude and the viscous damper comprised of piston 104 and passage 110 introduces the necessary frequency discrimination. This modification can replace the elements of FIGURE 1 which produce movement of valve element 35 during diffuser buzz.

The device for varying the position of valve element 78 can also be replaced by the modification of FIGURE 6 wherein an evacuated bellows 112 is connected to the valve element 78 to vary the area of orifice 75 in accordance with changes in atmospheric pressure rather than with changes in pressure $P_{T0}'$.

It is understood that devices responsive to other flight conditions can also be used to adjust orifice 75 or the orifice 75 can be fixed when no compensation of pressure $P_k$ is required. Also, the present invention can be utilized generally to detect pressure oscillations from other sources in addition to a diffuser. Various other modifications are contemplated by those skilled in the art without departing from the spirit and scope of the invention as hereinafter defined by the appended claims.

What is claimed is:

1. A device for detecting sustained pressure oscillations, comprising a pressure chamber, integrating means continually responsive to said pressure oscillations for producing in said chamber a substantially constant control pressure proportional to any given amplitude of said oscillations, means operative in response to said control pressure for sensing the presence of said oscillations, and filter means comprising a high pass filter and a low pass filter both responsive to said oscillations for selecting a frequency range of said pressure oscillations to which said integrating means is solely responsive.

2. A device as defined in claim 1 wherein said filter means comprises means for introducing a time lag in the production of said control pressure so that said sensing means is responsive only to pressure oscillations within the selected frequency range which continue after a selected time interval.

3. A buzz detector for detecting pressure oscillations in the diffuser of a jet engine comprising means connected with said diffuser and responsive to said pressure variations for producing a variable pressure signal during diffuser buzz proportional to the amplitude of diffuser buzz, means connected with said signal for integrating said pressure signal to produce a substantially constant control pressure proportional to any given amplitude of diffuser buzz, and means responsive to said control pressure for sensing diffuser buzz.

4. A buzz detector as defined in claim 3 wherein said signal producing means comprises a diaphragm responsive to said pressure variations, a pressure divider system comprising two orifices and a chamber therebetween, a pressure supply for said system, a valve element for varying the throat area of one of said orifices, and means for connecting said valve element to said diaphragm, said pressure signal being produced in said chamber.

5. A buzz detector as defined in claim 3 wherein said signal producing means comprises filter means for preventing the production of a pressure signal by pressure oscillations of predetermined frequencies.

6. A buzz detector as defined in claim 3 wherein said integrating means comprises filter means for filtering from said pressure signal frequencies of a preselected range.

7. A buzz detector as defined in claim 3 wherein said sensing means comprises pressure differential means receiving said control pressure on one side thereof, and means for biasing the opposite side of said differential means with a selected pressure variable with a flight condition.

8. A buzz detector for detecting pressure oscillations in the diffuser of a jet engine comprising means connected with said diffuser and responsive to said pressure variations for producing an oscillating control movement of a control member proportional to the amplitude of pressure oscillations, said producing means comprising filter means for preventing pressure oscillation in a predetermined frequency range from effecting said control movement, means responsive to the movement of said control member for developing an oscillating pressure signal proportional to the amplitude of diffuser oscillations, and means for integrating said pressure signal to produce a control pressure proportional to amplitude of diffuser oscillations, said integrating means being operable to filter oscillations from said pressure signal of a second predetermined frequency range, and means responsive to said control pressure for sensing diffuser oscillations above a preselected amplitude and within preselected frequencies.

9. A buzz detector as defined in claim 8 wherein said signal developing means comprises a pressure divider system having two orifices and a chamber therebetween, a supply pressure connected to said system, a valve element for varying the throat area of one of said orifices and connected to said control member, said valve element being stationary in position to provide minimum orifice area and maximum pressure within said chamber during diffuser operation without pressure oscillations therein the oscillating movement of said valve element with said control member during diffuser buzz providing said oscillating pressure signal in said chamber, said integrating means being connected with said chamber to provide a control pressure lower than said maximum pressure during diffuser buzz.

10. A buzz detector as defined in claim 9 having a second pressure divider system receiving the same supply pressure and having a second chamber between two orifices for producing a biasing pressure, the pressure in said second chamber being less than the pressure in said first chamber in the absence of diffuser buzz, said sensing means comprising differential pressure means connected with said second chamber on one side and with said integrating means on the other side so that said biasing pressure is less than said maximum pressure during operation without buzz and becomes equal to said control pressure during buzz.

11. A buzz detector as defined in claim 10 having means responsive to a selected flight condition for varying the throat area of one of the orifices in said second pressure divider system in order to vary said biasing pressure with said condition.

12. A buzz detector as defined in claim 8 having means for adjusting said sensing means in accordance with change in a selected variable in order to vary the amplitude sensed by said sensing means.

13. A device for detecting the occurrence of pressure oscillations within a pressure chamber comprising a diaphragm continually responsive on one side to the pressure within said chamber, means connected with said chamber for biasing the other side of said diaphragm with a pressure which is the same integral of the pressure in said chamber, means controlled by the movement of said diaphragm during pressure oscillations to produce a variable pressure signal proportional to the amplitude of said oscillations, means connected with said signal for integrating said pressure signal to produce a control pressure proportional to said amplitude, and means responsive to said control pressure for sensing the presence of pressure oscillations.

14. A device as defined in claim 13 wherein said biasing means includes highpass filter means for filtering out pressure oscillations in said chamber within a predetermined low frequency range, said pressure signal integrating means comprising lowpass filter means for filtering out pressure oscillation in said pressure signal within a predetermined high frequency range, and means for introducing a time lag in the production of said control pressure so that said sensing means is responsive only to pressure oscillations between said high and low frequency ranges which continue after the period of said time lag.

15. A device as defined in claim 13 wherein said sensing means comprises a second diaphragm receiving said control pressure on one side and means for introducing a selected pressure to the other side of said second diaphragm, the magnitude of said selected pressure determining the magnitude of the control pressure required for sensing the presence of pressure oscillations.

References Cited in the file of this patent

UNITED STATES PATENTS

| | | |
|---|---|---|
| 2,362,446 | Bodine | Nov. 14, 1944 |
| 2,450,835 | Lee | Oct. 5, 1948 |
| 2,470,565 | Loss | May 17, 1949 |
| 2,575,304 | Stover | Nov. 13, 1951 |
| 2,637,999 | Klebba | May 12, 1953 |
| 2,850,871 | Drake | Sept. 9, 1958 |
| 2,880,579 | Harshman | Apr. 7, 1959 |
| 2,911,788 | Lewis et al. | Nov. 10, 1959 |